United States Patent [19]

Leiber et al.

[11] Patent Number: 4,893,882
[45] Date of Patent: Jan. 16, 1990

[54] ANTILOCKING SYSTEM

[75] Inventors: Heinz Leiber, Oberriexingen; Manfred Steiner, Stuttgart, both of Fed. Rep. of Germany

[73] Assignee: Daimler-Benz Aktiengesellschaft, Stuttgart, Fed. Rep. of Germany

[21] Appl. No.: 339,109

[22] Filed: Apr. 17, 1989

[30] Foreign Application Priority Data

Apr. 16, 1988 [DE] Fed. Rep. of Germany ....... 3812832

[51] Int. Cl.$^4$ ..................................... B60T 8/32/8/42
[52] U.S. Cl. ..................................... 303/115; 303/116; 303/117
[58] Field of Search ............... 303/113, 115, 116, 119, 303/117

[56] References Cited

U.S. PATENT DOCUMENTS

| | | | |
|---|---|---|---|
| 4,627,670 | 12/1981 | Matsuda et al. | 303/115 |
| 4,632,339 | 12/1982 | Belart | 303/117 |
| 4,781,421 | 11/1988 | Nishimura et al. | 303/115 |
| 4,838,621 | 4/1989 | Furuta et al. | 303/115 |

Primary Examiner—Andres Kashnikow
Assistant Examiner—Matthew C. Graham

[57] ABSTRACT

An antilocking system for a road vehicle with static brake circuits operates on the principle of pressure modulation when brake pressure changes demanded by the control system remain small by changing the volume of a pressure modulator modulation chamber, which can be connected and disconnected to the wheel brake via an inlet valve. If larger brake pressure changes are necessary, the antilocking system operates on the pump-back principle, according to which brake fluid is pumped back via an outlet non-return valve from the modulation chamber into an output pressure space of the brake unit of the brake installation and before a further brake pressure reduction takes place in response to a renewed increase in volume of the modulation chamber. To permit switching from the pressure modulation to pump-back operation, the inlet valve is designed as a spool valve mechanically controlled by a hydraulically driven step piston, which forms the movable boundary of the modulation chamber. The spool valve takes up its shut off position when the piston reaches an end position associated with the maximum volume of the modulation chamber and only resumes its position connecting the wheel brakes with the modulation chamber after the step piston has executed a minimum stroke specified by the arrangement of stops on the piston and the spool and thus cause a reduction in the volume of the modulation chamber.

20 Claims, 2 Drawing Sheets

ANTILOCKING SYSTEM

BACKGROUND AND SUMMARY

The invention concerns an antilocking system for a road vehicle with a hydraulic multi-circuit brake installation which includes at least one static brake circuit connected to an outlet pressure space of a brake unit provided for brake pressure supply to the wheel brakes of a vehicle. The outlet pressure of the brake unit can be connected to the wheel brakes of the static brake circuit by means of an electrically actuated brake pressure control valve of a brake pressure setting device for controlling brake pressure reduction, brake pressure retention and brake pressure restoration phases of the antilocking control system. At least when the antilocking control system demands high magnitude pressure reductions, the brake pressure setting device operates on the pump-back principle according to which, in a brake pressure reduction phase, brake fluid is drained from the wheel brakes subject to the control system and is pumped back into the output pressure space of the brake unit. A pumping device is provided for this purpose and includes a stepped cylinder with two bore sections of difference diameters, offset relative to one another by means of a radial housing step. A stepped piston with piston flanges of correspondingly different diameters is guided in these bore sections so that it can be displaced in a pressure-tight manner. The larger step of the stepped piston forms an axially movable boundary of a drive pressure space, which space can be connected by means of an electrically actuated antilocking system control valve arrangement to the high pressure outlet of a hydraulic auxiliary pressure source and can, as an alternative to this, be relieved to the sump tank of the auxiliary pressure source. A smaller step of this stepped piston forms the movable boundary of a functional chamber acting as a pump chamber, in pump-back operations of the brake pressure setting device. This functional chamber can be connected, via an outlet non-return valve to the brake unit pressure outlet associated with the static brake circuit and, via a inlet valve, to the wheel brakes of the static brake circuit. A return spring is provided for biasing the stepped piston into its end position associated with maximum volume of the functional chamber, which can be connected to the wheel brakes. Actuation signals necessary for the correct switching of the brake pressure control valve and the electric solenoid valve arrangement controlling the stepped cylinder drive are created by an electronic control unit which generates these signals by a process of comparing and differentiating, with respect to time, electrical output signals from wheel rotational speed sensors whose output signals are a measure of the wheel peripheral speeds of the vehicle wheels in level and/or frequency.

Broadly such an antilocking system can be considered as known from DE-OS No. 33 47 618, although the control system on the static brake circuit, the front axle brake circuit, is designed as a single wheel control system with the brake pressure control valves individually associated with each of the vehicle wheels and a common brake pressure control system on both wheels of a brake circuit is only explicitly revealed for the rear axle brake circuit, designed as an open brake circuit.

For the static brake circuit, the known antilocking system provides a low pressure reservoir which initially accepts the brake fluid drained from a wheel brake, subject to the control system, in a pressure reduction phase. This brake fluid is then pumped back by means of a hydraulically driven return pump and into an output pressure space, associated with the static brake circuit, of the brake unit. This return pump is designed in such a way that between 0.2 and 0.4 $cm^3$ of brake fluid can be pumped back per piston stroke into the output pressure space of the brake unit. This corresponds to between 1/20 and 1/10 of that quantity of brake fluid which is forced into the brake circuit in a vehicle of the higher power class (vehicle weight approximately 1.5 tons and maximum speed approximately 200 km/h to 220 km/h) when braking occurs with the maximum pressure permitted by the brake installation design.

The valves provided as the brake pressure control valves are 3/3-way solenoid valves whose basic position is the brake pressure build-up position. These valves can be driven by a control signal of defined control current strength into a shut off position (the brake pressure retention position) and can be driven into a brake pressure reduction position by a control signal of defined higher strength (e.g. double, control current strength), in which position the wheel brakes of the static brake circuit, subjected to the control system are connected to a low pressure reservoir from which the brake fluid is pumped back into the outlet pressure space of the brake unit by means of the hydraulically driven feed pump.

In such a design of the brake antilocking system, pumping back to meet the requirements requires a drive for the hydraulic return pump with a stroke repetition frequency of at least 10 Hz which, because of the associated pressure shocks, leads to unpleasant noise in control operation. Such noise is not only disadvantageous because of the associated adverse effect on vehicle driving comfort but, above all, because particularly careful drivers who, due to a "defensive" driving style only cause the antilocking system to respond extremely rarely and are therefore not "accustomed" to such a noise, can be startled by it. This may cause them to react even worse in a moment of danger with which a braking situation requiring an antilocking system response is always associated. Also disadvantageous in this known antilocking system, is the necessary technical complication involved in achieving it. This is because of the low pressure reservoir and the complicated construction of the brake pressure control valves provided in addition to the hydraulically driven return pump.

The disadvantage of the unpleasant noise is avoided in an antilocking system known from DE-OS No. 29 08 482, in which the wheel brakes, subjected to an antilocking control, are each associated with a pressure modulator, which provides a brake pressure control action on the principle of producing brake pressure change by changing the volume of a modulator outlet pressure space to which the wheel brake cylinder of the particular wheel brake is directly connected. This modulator outlet pressure space has a movable axial boundary formed by a first piston flange of a control piston. The control piston also has a second piston flange solidly connected to the first flange by means of an elongated piston rod. This second piston flange is guided so that it can be displaced in a pressure-tight manner in a larger step of a stepped bore of the modulator housing where it forms the axially movable boundary of a reaction space. This reaction space is permanently connected to the high outlet pressure of an auxiliary pressure source and a drive pressure space, whose axially movable boundary is formed by the second larger flange of the control piston and whose axially fixed boundary is formed by an end wall of the modulator housing. It is possible to alternatively connect this drive pressure space (by means of electrically triggered inlet and outlet valves) to the high pressure outlet of the auxiliary pressure source and to its non-pressurized reservoir. A return spring is supported on the end wall of the modulator housing forming the boundary of the drive pressure space and fixed relative to the housing of the drive pressure space. This return spring acts on the larger piston flange of the control piston and biases into its basic position associated with the minimum volume of the outlet pressure space of the modulator. This minimum volume is associated with normal brake operation, i.e. brake operation not subjected to the control system. In this basic position of the control piston, a central valve, located in its smaller piston flange, is held in its open position against the action a valve spring, because its valve body is supported by a stop pin fixed relative to the housing. In this open position of the central valve, the modulator outlet pressure space (connected to the wheel brake cylinder) is connected to an inlet space which is connected to the outlet pressure space of a brake unit in which an actuating force proportional to the brake pressure can be built up by actuation of a brake pedal. The second axial boundary of this inlet space is formed by the smaller diameter step of an annular piston designed as a stepped piston, which is sealed so that it can be displaced, both against the smaller bore step of the housing bore and against the piston rod connecting together the two piston flanges of the control piston. Between the two bore steps, closed by the end walls of the modulator housing, is interposed a third bore step, which has the largest diameter. The piston is sealed against the third bore step so that it can be displaced. A radial annular piston flange, which follows on from the pistons smallest step, forms the boundary of the inlet space. At an axial distance from this flange, the annular piston has a second radial flange which is sealed, so that it can be displaced against that bore step in which the larger flange of the control piston is also guided. Thus, it too can be displaced in a pressure-tight manner. The annular piston is pan-shaped on an end facing towards the reaction space in such a way that its outer shell surrounds, at a radial distance, the piston-rod shaped central section of the control piston and, together with the latter, forms the boundary of an inner annular space. This space communicates through a transverse duct of the annular piston with an outer annular space, whose axial boundaries are formed by the two radial flanges of the annular piston. The outer annular space is permanently connected to the non-pressurized reservoir of the auxiliary pressure source. The largest diameter flange of the annular piston and a housing step form the axial boundaries of an annular space used as the drive pressure space. A valve which, due to an axial displacement of the control piston acting to increase the volume of the modulator outlet pressure space, opens into the annular space in a functional position so that it communicates with the reaction space and is therefore also subject to the high outlet pressure of the auxiliary pressure source. The valve body of this valve is designed as an essentially cylindrical sleeve which is sealed on the reaction space side against the piston rod of the control piston so that it can be displaced. Otherwise however, the sleeve outer shell surrounds the central piston rod of the control piston with a small radial distance between them so that there is an inner annular gap within the valve body communicating with the non-pressurized annular space. The valve body is sealed on the outside against the outer shell of the pan-shaped annular piston part so that is can be displaced. The sleeve-shaped valve body has, on its section sealed against the piston rod of the control piston, an external conically shaped sealing surface which forms a boundary of an external groove of the valve body. The external groove extends between this conical sealing surface and the section of the valve body sealed against the annular piston and together with the valve body, forms an annular space which is connected to communicate via transverse and longitudinal ducts with the non-pressurized annular space of the annular piston and with the annular space which can be used as the drive pressure space. The valve body is forced by a valve spring into sealing contact of its conical surface with the edge of the reaction space end opening of the annular piston.

In order to achieve a pressure reduction phase of the antilocking control system and a drive pressure reduction phase of the antilocking control system, the drive pressure space of the modulator is shut off against its reaction space and is instead connected via the outlet valve to the non-pressurized sump reservoir of the auxiliary pressure source. By this means, the control piston experiences an introductory displacement, such as to increase the modulator outlet pressure space, which is connected to the wheel brake cylinder of the wheel brake which can be subjected to the control system. In consequence, the central valve of the piston flange forming the boundary of the modulator outlet pressure space closes; the communicating connection between the non-pressurized annular space of the annular piston and the annular space and annular gap, bounded by the valve body and the annular piston is also interrupted by contact between a central stop and sealing flange of the control piston and an inner edge of the sleeve-shaped valve body. Due to the displacement of the control piston, and therefore also of the sleeve-shaped valve body, the conical sealing surface of the latter rises from the seat formed by the annular piston and the pressure present in the reaction space is also connected into the annular drive pressure space. This results in the annular piston always following the motion of the control piston, which is itself displaced so as to increase the volume of the outlet pressure space in the reaction space (if the pressure in the drive pressure space bounded by the larger flange of the control piston is relieved). On the basis of the construction of the pressure modulator and its function explained up to this point, it follows that the stroke of the control piston must be dimensioned so as to be sufficiently large for complete pressure reduction at its maximum stroke and that pump-back operation by means of the pressure modulator is impossible. Although the antilocking system known from DE-OS No. 29 08 482 has the advantage that practically no noise occurs when it responds, it does have the severe disadvantage that in no case where the antilocking system responds, is the driver given an obvious pedal reaction to indicate this fact, A compromise, advantageous relative to the above, between undesired noise and a pedal reaction which is desirable in the case of an "extreme" response of the antilocking system (which will be correspondingly rare) is provided by Applicants' own German patent application P No. 36 37 781.3. This describes an antilocking system with pressure modulators which have a piston which can be displaced in a housing, the piston forming the boundary of an outlet pressure space which can be alternatively connected to the high pressure outlet and the non-pressurized reservoir of the modulator. This piston displacement occurs by action of the pressure present at auxiliary pressure source to provide control of the brake pressure reduction and brake pressure build-up phases of an antilocking control cycle. These pressure modulators have at least one return spring which urges the piston into a position associated with maximum volume of the primary chamber for controlling the pressure build-up and pressure reduction phases of an antilocking system control valve arrangement. The piston of the particular pressure modulator is designed as a stepped piston, whose smaller piston step forms a boundary of the outlet pressure space and whose larger piston step forms a boundary of the drive pressure space. In normal brake operation, the drive pressure space is subject to the high outlet pressure of the auxiliary pressure source so that the piston is forced against the action of a powerful return spring into its basic position associated with minimum volume of the modulator outlet pressure space. In this basic position, an inlet valve is mechanically driven into its open position in which the outlet pressure space, associated with the controllable brake circuit of the brake unit of the brake installation, is connected to communicate with the outlet pressure space of the pressure modulator.

This inlet valve is designed as a non-return valve which has already taken up its shut off position in the introductory phase of a pressure reduction stroke of the modulator piston, which is controlled by relieving the pressure in its drive pressure space. After the inlet valve has taken up this shut off position, an increasing pressure reduction occurs in the modulator outlet pressure space with further displacement of the modulator piston. The increase in the modulator outlet pressure space, attainable by means of a piston displacement, is smaller than the volume of the liquid quantity which can be forced, at maximum braking pressure, into the wheel brake(s) of the brake circuit connected to the pressure modulator. The wheel brake(s) controllable by such a pressure modulator can be shut off from the outlet pressure space of the pressure modulator by means of a solenoid valve whose basic position is the open position. If the brake pressure reduction attainable by a single pressure reduction stroke of the modulator is not sufficient for the antilocking control, the particular wheel brake is shut off from the modulator outlet pressure space and then the drive pressure space of the modulator is again subject to drive pressure so that it now operates as a return pump, which pumps brake fluid previously drained from a wheel brake back into the brake unit, in order to reduce brake pressure at the wheel brakes.

In order that braking can still take place in the case of a failure of the auxiliary pressure source, the modulator piston takes up its end position associated with the maximum volume of the modulator outlet pressure space in which the inlet valve is shut off. The modulator is provided with a mechanical controlled bypass valve which is open in the end position of the modulator piston with the faulty function mentioned. This permits connection of brake pressure from the brake unit via the modulator outlet pressure space into the wheel brake(s). However, as soon as the modulator position is displaced, even if only slightly, from its end position so as to produce brake pressure restoration or to produce pump-back operation, the bypass valve closes again. The valve body of the bypass valve is forced against its valve seat with a closing force which becomes greater as the modulator piston becomes "closer" to its position corresponding to the minimum volume of the modulator outlet pressure space. A disadvantage of this arrangement is that situation in which the auxiliary pressure source has only "partially" failed, in such a way that its outlet pressure is just insufficient to hold the modulator piston in the position corresponding to minimum volume of the outlet pressure space against the effect of the return spring and the outlet pressure of the brake unit connected into its outlet pressure space. This holds the modulation piston in a position slightly displaced from the ideal, and although the inlet valve is closed, the bypass valve cannot open and the brake installation is practically inoperative. An antilocking system with pressure modulators of the type described in the German patent application P No. 36 37 781.2 is therefore questionable for safety reasons.

The object of the invention is therefore to improve an antilocking system of the general type mentioned at the beginning in such a way that, without adverse effect on the control functions, the technical complexity necessary to achieve the system is reduced, the noise due to the control system is substantially avoided and, in addition, high functional reliability of the brake installation overall is ensured.

The invention achieves the object by having the inlet valve designed as a 2/2-way valve, controlled by stroke motions of the stepped piston 27, and held in its open position when the position of the stepped piston is associated with minimum volume of the functional chamber which can be connected to the wheel brakes. This 2/2-way valve, starting from this open position, can only reach its shut off position by a displacement of the stepped piston taking place in the sense of increasing the functional chamber. When the stepped piston has reached a position in the immediate vicinity of its end position associated with maximum volume of the functional chamber and starting from this end position, the 2/2-way valve 48 only returns to the open position by means of a displacement of the stepped piston taking place in the sense of reducing the volume of the functional chamber, after the stepped piston has executed a minimum stroke h, relative to this end position. A position indicator is provided which generates electrical output signals which are characteristic of the positions of the piston and continually vary with changes to them. The output signals of the position indicator are fed as additional information inputs to an electronic control unit which, by processing them, generates signals for switching over the antilocking control valve arrangement by which the pump-back operation of the stepped cylinder 24 can be controlled. The difference in the volumes of the functional chamber, between its maximum and minimum values, is between 1/5 and ⅓ of that volume of brake fluid which must be forced into the wheel brakes of the static brake circuit in order to achieve the maximum brake pressure permitted by the design of the brake installation.

The antilocking system of the invention is suitable for control both on the so-called select-low principle, according to which brake pressure changes caused by the control system in each wheel brake of the static brake circuit take place in the same sense and with the control system coming into action as soon as a locking tendency occurs on only one of the wheel brakes of the static brake circuit and being maintained as long as wheel brake of this static brake circuit exhibits a locking tendency; and control on the so-called select-high principle, according to which control is only initiated when all the wheel brakes of the static brake circuit show a locking tendency but in which control is maintained as long as there is a locking tendency even if on only one of the wheel brakes of the static brake circuit. A control system employing the first-name principle is advantageous where the static brake circuit is the rear axle brake circuit of the vehicle whereas control according to the second principle is suitable for a static brake circuit including both front wheels. For both types of control, the construction per brake circuit of the antilocking system uses: only one brake 2/2-way solenoid pressure control valve; a stepped cylinder with a mechanically controlled function valve, which provides automatic switching as required from pressure modulation operation to pump-back operation of the stepped cylinder;, and only one antilocking system control valve arrangement, by means of which the drive control of the stepped cylinder takes place. This construction is very simple, because it is substantially easier to control a two-position solenoid valve than a three-position solenoid valve in contrast to the known antilocking system. This alone provides a substantial control technique simplification relative to the known antilocking system. Since, from the statistical point of view, an overwhelming majority (more than 95%) of braking situations involve actuating the brake installation with a force which corresponds to at most one fourth, or a smaller fraction, of that actuation force that must be employed in order to generate the maximum brake pressure permitted by the brake installation design, the increase in functional chamber volume achievable by a single "suction" stroke of the piston of the stepped cylinder also suffices even if it is necessary in a corresponding high, proportion of brake situations requiring control to achieve the largest possible brake pressure reduction at the wheel brake(s) subject to the control system so that switching the stepped cylinder to pump-back operation only occurs on rare occasions. Therefore, in the overwhelming majority of braking actions subject to an antilocking control system, the stepped cylinder also fulfills the function of a pressure reservoir provided in the known antilocking system, which can therefore be omitted in the antilocking system of the invention. This permits a further substantial reduction in the technical complication necessary for the development of the antilocking system of the invention. The antilocking system according to the invention therefore operates in the overwhelming majority of braking situations requiring control, corresponding to the statistical frequency mentioned, by so-called pressure modulation operation, i.e. in that mode of operation in which brake fluid which is accepted in the functional chamber of the stepped cylinder (considered in this case as the modulation chamber) in order to reduce the pressure in the wheel brakes, is forced back into the wheel brakes in brake pressure restoration phases of the antilocking control system so that a single pressure reduction stroke and restoration stroke of the stepped piston is required to achieve the brake pressure changes necessary for control. This is of benefit both with respect to the sensitivity of the control system and with respect to the "control comfort" because it substantially avoids otherwise disturbing noise.

The design of the stepped cylinder, wherein a pump-back stroke of the stepped piston can pump back a quantity of brake fluid into the outlet pressure space of the brake unit whose volume is between $\frac{1}{4}$ and $\frac{1}{2}$ of the difference between the minimum and maximum values of the volume of the functional chamber of the stepped cylinder, allows the cylinder to act mainly in pressure modulation operation, i.e. as pressure modulator. This achieves the result that, even with suitably small spatial dimensions of the piston cylinder, a repetition of the pump-back stroke cycle of the piston of the stepped cylinder only becomes necessary on very rare occasions, which again is of benefit to control comfort.

It is advantageous if the inlet valve is designed as a spool valve whose housing, is an axial extension of the stepped cylinder, from its section forming the boundary of the functional chamber. A valve bore containing the valve body of the spool valve is designed as a bind hole starting at the bore step forming the fixed boundary, of the functional chamber The blind hole is offset by a housing step relative to the cylinder bore step, in the immediate vicinity of which the valve spool is sealed so that it can be displaced relative to the functional chamber. The valve spool of the inlet valve is provided with a radial flange at an end section located within the functional chamber of the stepped cylinder. The radial flange is, in turn, encompassed by a stop flange, pointing radially inwards of the stepped piston. These two flanges determine the maximum magnitude h of a possible relative stroke motion between the stepped piston and the valve spool. The valve spool is also provided with an end flange which forms the movable boundary of a balance space which is in continuous communicating connection with the functional chamber of the stepped cylinder used for brake pressure modulation via a longitudinal and a transverse duct of the valve spool. This end flange of the valve spool forms the boundary of the balance space at one end and also forms the valve body of the inlet valve, which in its shut off position, closes both the valve inlet duct entering the blind hole and an overflow duct leading from the blind hole to the functional chamber. This provides for a simple design means of the function switch-over valve of the stepped cylinder of the antilocking system.

The configuration of the antilocking system control valve arrangement includes two valves which can be actuated electrically and are each designed as 2/2-way valves. The basic position of one valve causes the output pressure of the auxiliary pressure source to be connected to the control pressure space of the stepped cylinder and its actuated position causes the control pressure space to be shut off relative to the auxiliary pressure source. The basic position of the second valve causes the control pressure space to be shut off relative to the non-pressurized sump tank of the auxiliary pressure source and its actuated position connects the control pressure space to the sump tank of the auxiliary pressure source. This has the advantage that when the brake pressure control valve is shut off, brake pressure retention phases of the antilocking control system can be controlled in a simple manner by means of the antilocking system control valve arrangement alone.

Other objects, advantages and novel features of the present invention will become apparent from the following detailed description of the invention when considered in conjunction with the accompanying drawings.

BRIEF DESCRIPTION OF THE DRAWINGS

FIGS. 2a, 2b, 2c, 2d, 2e, 2f, and 2g show the pressure modulator in various functional states, each intended to explain the antilocking system according to FIG. 1 and with each shown in section along a plane of its central longitudinal axis.

DETAILED DESCRIPTION OF THE DRAWINGS

Figure 1:
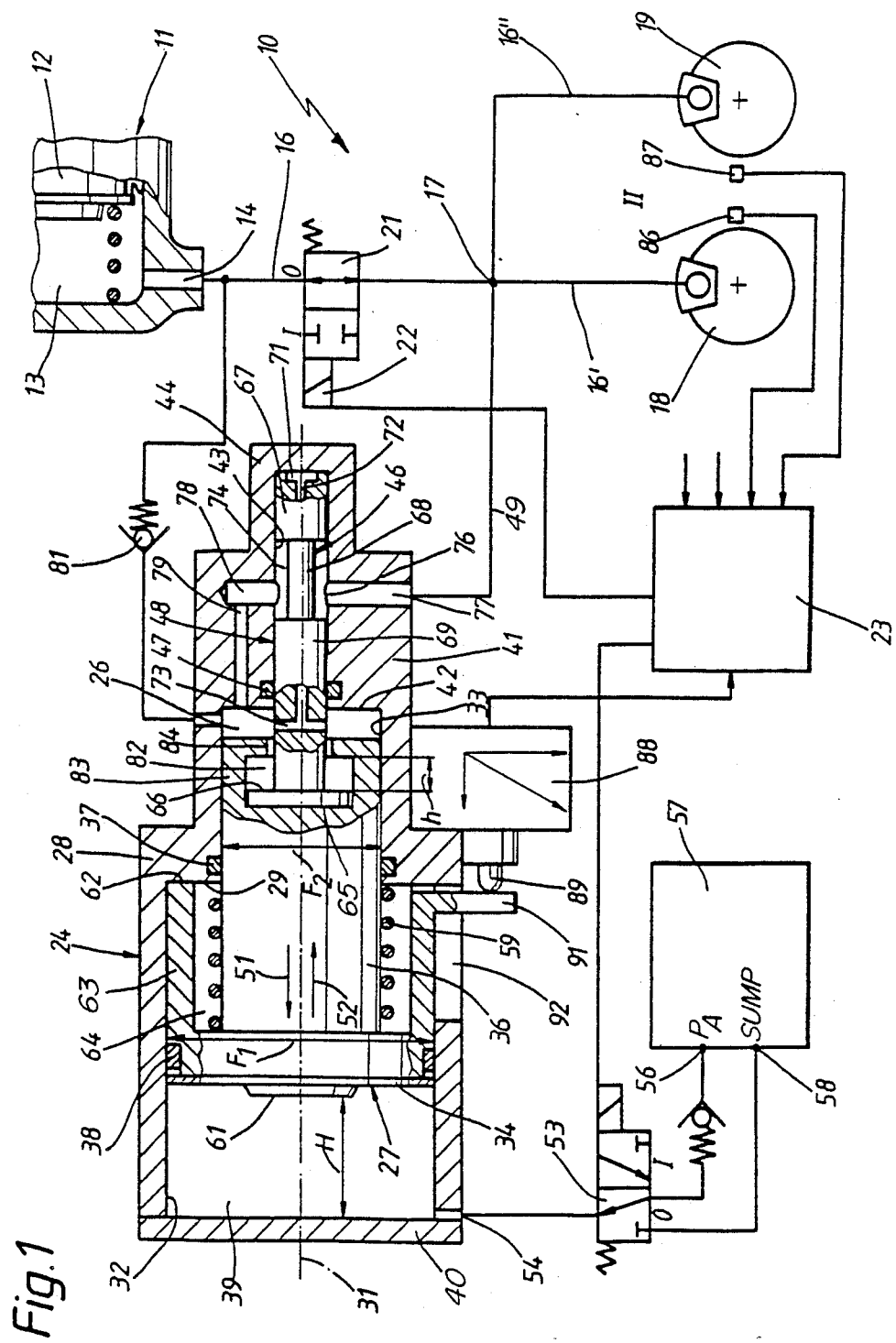
FIG. 1 shows an electro-hydraulic block circuit diagram of an antilocking system according to the invention with a pressure modulator provided for controlling brake pressure change phases and also providing the function of a return pump.

FIG. 1 shows the components essential to the function of an antilocking system wherein the system is intended for a road vehicle with static brake circuits and with a front and rear axle brake circuit subdivision. For simplicity, only the components of the antilocking system 10 and the brake installation associated with the vehicle rear axle brake circuit II are shown in FIG. 1. The brake unit is assumed to be of a conventional type with a tandem main cylinder 11 which can be actuated by means of a brake pedal (not shown), if necessary via a braking force amplifier (also not shown). The rear axle brake circuit II is connected to the tandem main cylinder secondary outlet pressure space 13, which has a movable boundary formed by the floating piston 12 of the tandem main cylinder 11.

A main brake pipe 16 is connected between the pressure outlet 14 of the secondary outlet pressure space 13 and the branch position 17 of the brake pipe branches 16' and 16" leading to the left-hand rear wheel brake 18 and the right-hand rear wheel brake 19. This main pipe 16 can be shut off and opened electrically by means of a brake pressure control valve 21. This brake pressure control valve is designed as a 2/2-way solenoid valve whose basic "O" position is its through-flow position and whose actuated "I" position, which is taken up when its control magnet 22 is triggered by the output signal of an electronic control unit 23 provided for controlling the control phases of the antilocking system, is its shut off position.

A central functional element of the antilocking system brake pressure setting device 10 is a pressure modulator 24 which, depending on the amount by which the brake pressure must be changed during the course of an antilocking control cycle (i.e., reduced and restored), permits control of these change simply by increasing or reducing the volume of a modulation chamber 26. This occurs when the necessary brake pressure changes are of relatively small magnitude. The antilock system 10 also permits control operation on the so-called pump-back principle according to which, in a brake pressure reduction phase of the antilocking control system, brake fluid drained from the wheel brakes 18 and 19 and is pumped back, during a brake pressure retention phase, at least partially into the secondary outlet pressure space 13 of the brake unit 11. The antilocking system operates in the pump-back operating mode when the control system demands a brake pressure reduction of greater magnitude than is possible by means of a single volume changing stroke of the modulator piston 27 forming the boundary of the modulation chamber 26.

The fundamental structure of the pressure modulator 24 is a stepped cylinder whose housing 28 has two bore steps 32 and 33, coaxial relative to the central axis 31 and offset relative to one another by a radial housing step 29 which connects them. The modulator piston 27 is formed with piston steps 34 and 36 and is guided so that the piston steps can be displaced in a pressure-tight manner in the bore steps 32 and 33 respectively.

A ring seal 37, fixed relative to the housing, is provided for sealing the smaller piston step 36 against the bore step 33 of the cylinder housing 28, this seal being located in the immediate vicinity of the housing step 29. A ring seal 38, fixed relative to the piston, is provided for sealing the larger piston step 34 against the housing bore 32. This larger piston step 34 forms the axially movable boundary of a control pressure space 39, which has an axial fixed boundary relative to the housing formed by a left-handed end wall 40 of the modulator housing 28.

The smaller piston step 36 forms the axially movable boundary of the modulation chamber 26, which has another boundary which is fixed relative to the housing and is formed by the housing part 41, in which there is a blind hold 43, coaxial with the central longitudinal axis 31 of the pressure modulator 24. A radial housing step 42 is off-set and connected to the bore step 33, which accepts the smaller piston step 36. Viewed in the axial direction, this blind hole 43 is closed by the right-hand end wall 44 located remote from the left-hand internal end wall 41 of the modulator housing 28. This blind hole 43 forms a third step of the modulator housing 28, and has a diameter which is much smaller than the central bore step 33 extending between this blind hole 43 and the largest bore step 32. The radial step 33 forms a fixed radial boundary of the modulation chamber 26. A valve spool 46 is guided in this blind hole 43 so that it can be displaced forwardly and backwardly, viewed in the direction of the central longitudinal axis 31 of the modulator housing 28 and is sealed against the blind hole 43 by means of a ring seal 47, fixed relative to the housing and located in the immediate vicinity of the housing step 42 offsetting the blind hold 43 relative to the central bore step 33.

This valve spool 46 forms the valve body of an displacement controlled function control valve 48 which, if necessary, causes the pump-back operation to switch on automatically if the pressure modulation operation control (brake pressure reduction and brake pressure restoration phases by volume change to the modulation chamber 26) is no longer sufficient to achieve the necessary brake pressure changes.

The function control valve 48 is constructed as a 2/2-way valve in whose alternative functional positions (through-flow position and shut off position) the modulation chamber 26 is either connected via the connecting pipe 49 (between the brake pressure control valve 21 and the wheel brakes 18 and 19) to the main brake pipe 16 or is shut off against the latter. The through flow condition occurs when the antilocking system 10 is acting in pure modulation operation and cut-off occurs when the antilocking system 10 acts in pump-back operation. The closing and opening strokes of the valve body 46 of the function control valve 48 are correlated with the strokes of the modulator piston 27 to produce an increase in the volume of the modulation chamber 26 in the direction of the arrow 51, or to reduce the volume when the modulator piston 27 moves in the opposite direction along arrow 52. This correlation is achieved by stop effects between the function control valve spool 46 and the modulator piston 27 in such a way that the function control valve 48 arrives at its shut off position when the modulator piston 27 reaches a position which corresponds approximately to its left-hand end position, as associated with maximum volume of the modulation chamber 26. The function control valve spool 46 only returns to its open position after the modulator piston 27, starting from its left-hand end position, has executed in the opposite direction 52, a pump-back stroke which corresponds to a part (e.g. ⅓ to ½) of that stroke which the modulator piston 27 can execute between its end positions associated with maximum and minimum volume of the modulation chamber 26.

Before the design details of this operation of the function control valve 48 and the modulator piston 27 are explained in detail, consideration will be given to those configuration features of the pressure modulator 24 and its electro-hydraulic switching peripherals which are provided both for pressure modulation operation and for pump-back operation of the antilocking system 10.

An antilocking system 3/2-way solenoid control valve 53, triggered by electrical output signals of the electronic control unit 23, is provided for the correct functional control of the pressure modulator 24. In the basic "O" position of this valve, the control connection 54 of the drive pressure control space 39 of the pressure modulator 24 is connected to the pressure outlet 56 of an auxiliary pressure source 57, which is held at a high pressure level $P_A$, and is shut off against a non-pressurized sump tank connection 58. When the cross-sectional area $F_1$ of the larger piston step 34 of the modulator piston 27 is subject to this pressure $P_A$ the modulator piston 27 is forced into the right-hand end position, as shown in FIG. 1. This defines the minimum volume of the modulation chamber 26. The modulator piston 27 works against the return force of a powerful return spring 59, which tends to force the modulator piston 27 into its left-hand end position (as shown in FIG. 1) and also against the brake pressure present in the modulation chamber 26 and to which the modulator piston 27 is subjected on the cross-sectional area $F_2$ of its smaller piston step. The left hand end position of the modulator piston defines the maximum volume of modulation chamber 26. The right-hand end position of the modulator piston 27 is used as the initial position for a normal braking action, i.e. one which is not subject to antilocking control.

In the actuated "I" position of the antilocking system control valve 53, also controlled by an output signal of the electronic control unit 23, the control pressure space 39 of the pressure modulator 24 is connected to the tank pump connection 58 of the auxiliary pressure source 57 and is shut off against high pressure $P_A$ at its pressure outlet 56. In this functional position of the antilocking system control valve 53, the modulator piston 27 can be pushed into its left-hand end position, associated with maximum volume of the modulation chamber 26, by the action of the return spring 59. This left-hand end position is indicated by contact between a protrusion 61 on the modulator piston 27, only slightly extended in the axial direction, and the end wall 41 of the modulator housing 28 forming the fixed axial boundary of the control pressure space 39. The right-hand end position of the modulator piston 27, corresponding to the minimum volume of the modulation chamber 26, is indicated by contact between the housing step 29 and a free edge 62 of a cylindrical shroud-shaped guide sleeve 63 solidly connected to the larger piston step 34. The sleeve 63 coaxially surrounds, at a radial distance, the section of the smaller piston step 36 which connects with the larger piston step 34. Viewed in the basic position of the modulator piston 27 shown, the complete length of the return spring 59 is enclosed in an annular gap 64 bounded on the outside by the guide sleeve 63 and on the inside by the smaller piston step 36.

This right end position of the modulator piston 27 is used as the basic position for a normal braking operation. Here the valve spool 46 of the function control valve 48 is also held in its right-hand end position shown, which is obtained through a stop effect of a radial stop flange 65 on the modulator piston 27 and a driven flange 66 arranged on the piston end of the valve spool 46. In this end position, the valve spool 46, is supported by its end section, away from the piston, abutting on the end wall 44 forming the end of the blind hole 43 of the modulator housing 28 or, at least held at a small distance from it. This end section of the valve spool 46 is designed as a piston flange 67, which can be slidingly displaced in a pressure-tight manner within the blind hole 43, and which is connected by a somewhat smaller diameter rod-shaped intermediate piece 68 to the longitudinally extended piston-shaped section 69, displaceably sealed against the section of the blind hole 43 by the annular seal 47, which is fixed relative to the housing. The longitudinally extended piston-shaped section 69 protrudes into the modulation chamber 26 and is provided with the radial flange 66 at its end facing towards the modulator piston 27. Within the blind hole 43 there is a balance space 71 which has an axially movable boundary formed by the flange-shaped end section 67 of the spool 46 and fixed end wall 44 of the blind hole 43. This balance space 71 is held in continuous communicating connection with the modulation chamber 26 by means of a longitudinal duct 72, passing axially through the valve spool 46 over the major part of its length, and a transverse duct 73 entering the modulation chamber 26 so that the valve spool 46 is arranged to be pressure-balanced within the pressure modulator 24, i.e. it can experience a displacement only if it is taken along by the modulator piston 27.

The two piston flanges 67 and 69 form boundaries for the annular gap 74, which when viewed in the basic position of the valve spool 46 shown, is located at the opening 76 of the radial valve connection duct 77 which is connected via the connecting pipe 49 to the main brake pipe 16 of the rear axle brake circuit II. Also entering the blind hold 43, when the annular space 74 is in the basic position of the valve spool 46, shown is another radial transverse duct 78 which has communicating connection via a longitudinal duct 79 with the modulation chamber 26 of the pressure modulator 24. The modulation chamber 26 is therefore connected, in the shown basic position of the modulator piston 27 and valve spool 46, to the section of the main brake pipe branching off to the rear wheel brakes 18 and 19. In addition, the modulation chamber 26 is connected to the pressure outlet 14 of the secondary outlet pressure space 13 of the brake unit 11 via an outlet non-return valve 81 which is driven into an open position by higher pressure in the modulation chamber 26 relative to that in the outlet pressure space 13 of the brake unit 11 and is otherwise held in its shut off position. The closing force of this outlet non-return valve 81 is equivalent to a pressure difference of 2 bar in a typical design. The smaller piston step 36 of the modulator piston 27 has, on its end forming the boundary of the modulation chamber 26, a pan-shaped depression 82 which accepts the stop flange 66 of the valve spool 46. In the position shown, the stop flange 66 of the latter and the bottom 65 of the pan-shaped depression 82 are touching. At the free edge of the pan-shaped section 83 of the smaller modulator piston step 36 forming the radial boundary of this depression 82, there is a stop ring 84 pointing radially inwards. In the basic position shown of the modulator piston 27 and the valve spool 46, the stop ring 84 is located at an axial distance h from the stop flange 66 of the valve spool 46. This distance h determines the maximum stroke of the motion which the modulator piston 27 can execute relative to the valve spool 46 before the latter, "at the latest", is forced out of its shown end position when the modulator piston 27 experiences a displacement in the direction of the arrow 51. Then the valve spool 46 is taken along by the modulator piston 27 as soon as the stop ring 84 comes into contact with the flange 66 of the valve spool 46. Because it is taken along in this way, the piston flange 67 of the valve spool 46 forming the boundary of the balance space 71, arrives in a position closing the opening 76 of the valve connection duct 77. This occurs after the modulator piston 27 has executed the major part (e.g. 90%) of its maximum stroke H leading to its end position associated with the maximum volume of the modulation chamber 26. Here the valve spool 46 closes off the modulation chamber 26 of the pressure modulator 24 from the wheel brakes 18 and 19 of the rear axle brake circuit II for the remainder of the stroke of the modulator piston 27.

If the modulator piston 27 is subsequently displaced again (in the direction of the arrow 52) so as to reduce the volume of the modulation chamber 26, the valve spool 46 remains in the shut off position previously taken up, due to the friction of the ring seal 47 and the pressure balance between the modulation chamber 26 and the balance space 71. When the stop face 65 of the modulator piston 27 meets the stop flange 66 of the valve spool 46, valve spool 46 again experiences a displacement such as to produce a transition of the function control valve 48 into its open position. While the modulator piston 27 executes its stroke h relative to the valve spool 46, which in the meantime maintains the shut off position of the function control valve 48, the outlet non-return valve 81 is opened, due to the increasing pressure in the modulation chamber 26, so that brake fluid is pumped back from the modulation chamber 26 into the outlet pressure space 13 of the brake unit 11, if the brake pressure control valve 21 is switched into its shut off position. As soon as the piston flange 67 of the valve spool 46 again passes the opening 76 of the connecting duct 77 of the function control valve 48, further movement of the modulator piston 27 (taking place in the direction of the arrow 52) again connects the wheel brakes 18 and 19 to the modulation chamber 26 through line 77 so that antilocking control on the principle of pressure modulation can again take place.

In addition, the pressure modulator 24 is equipped with a position indicator 88 which generates an electrical output signal continually varying with the deflection of the modulator piston 27 and characteristic of the particular piston position. This electrical output signal is supplied as an additional information input to the electric control unit 23. This position indicator 88, which can be designed in an intrinsically known manner as a resistance or inductive signal generator, records the variable axial position of piston 27. A signal generator element 89, which is preloaded by a spring (not shown) is supported against a radial actuation arm 91 which protrudes radially through a longitudinal slot 92 of the modulator housing 28, from a stop edge of the guide sleeve 63 of the larger piston step 34. The axial extent of this longitudinal slot 92 is at least and approximately equal to the maximum stroke H of the modulator piston 27. The output signal of this position indicator 88, characteristic of the particular instantaneous position of the modulator piston 27 is used, in a manner to be described in more detail later, for controlling the stroke of the modulator piston 27. It can also be used in many ways for functional checking e.g. of the brake pressure control valve 21 and/or the antilocking system control valve 53.

For a more detailed explanation of the function of the antilocking system 10, reference is now made to the details in FIGS. 2a through 2f, in which positions of the modulator piston 27 and the valve spool 46 of the pressure modulator 24 are represented in the various phases of an antilocking control system achievable with the antilocking system 10.

Starting with the functional condition of the components of the antilocking system 10 associated with the normal braking operation illustrated in FIG. 1, it is assumed that a locking tendency occurs on at least one of the real wheel brakes 18 and/or 19. The electronic control unit 23 recognizes this locking tendency by a process, using known criteria, of comparing and differentiating (with respect to time) the output signals of wheel rotational speed sensors 86 and 87, which emit electrical output signals which are a measure in signal level and/or frequency of the wheel peripheral speeds of the monitored vehicle wheels. To simplify the representation only two wheel rotational speed sensors are shown in FIG. 1, these being the ones individually associated with each of the two rear wheels of the vehicle.

The electronic control unit 23 then generates a first output signal by means of which the brake pressure control valve 21 is driven into its shut off "I" position and in consequence, the wheel brakes 18 and 19 are shut off against the outlet pressure space 13 of the brake unit 11. A second output signal of the electronic control 23 switches the antilocking system control valve 53 into its actuated "I" position causing the pressure in the control pressure space 39 of the pressure modulator 24 to be connected to pump connection 58. Because of this, the modulator piston 27 experiences a displacement in the direction of arrow 51 of FIG. 1 and brake fluid can flow from the wheel brakes 18 and 19 into the expanding modulation chamber 26 via the function control valve 48, which is in its open position. This operation thus provides for a brake pressure reduction as initiating the antilocking control cycle. If, due to a brake pressure reduction stroke $H_1$ by which the modulator piston 27 arrives in the position shown in FIG. 2a, in which the valve spool 46 of the function control valve 48 has in fact been taken along in the direction of its shut off position by the amount $H_1$-h, but has not yet reached its shut off position, and a significant reduction in the locking tendency is achieved because of brake fluid flow into the installation chambers 26, the antilocking system control valve 53 is switched back into its basic "O" position even before the locking tendency has fully decayed. The brake pressure control valve 21 is still held, for the present, in its shut off "I" position. By this operation, brake fluid which has been accepted by the modulation chamber 26 in the preceding pressure reduction phase is forced back directly into the wheel brakes 18 and 19 so that the brake pressure then is again increased, as a maximum, to the magnitude previously selected by actuation of the brake unit 11. If, in consequence, the locking tendency on the rear axle does not increase again, but continues to decrease, the brake pressure control valve 21 is switched back into its through-flow "O" position as soon as the brake slip of the rear wheels has fallen to a value within the required value range to be maintained by the control system. Then the brake pressure in the wheel brakes 18 and 19 is again controlled by means of the brake unit 11 acting through control valve 21.

Figures 2A, 2B, 2C:
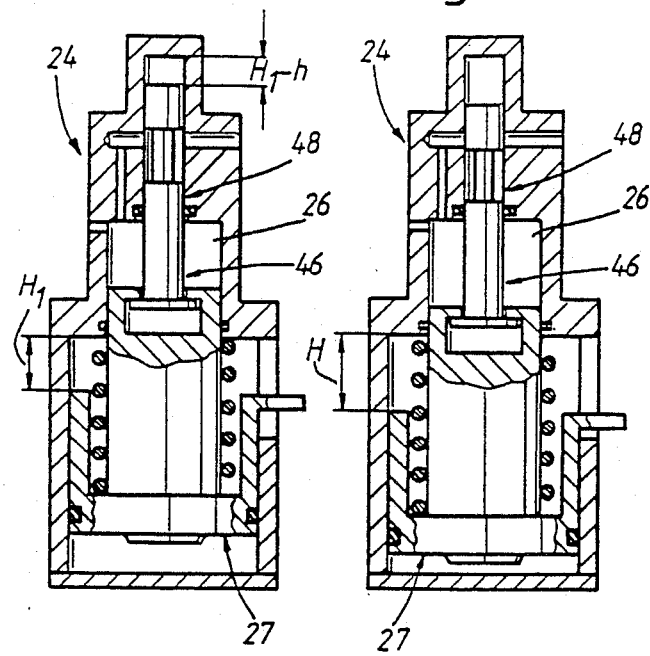

If a limited pressure reduction stroke $H_1$, as described using FIG. 2a, or even a maximum brake pressure reduction stroke H by means of which the modulator piston 27 arrives in the end position shown in FIG. 2b, in which the function control valve 48 has reached its shut off position, does not suffice to cause the locking tendency to decay as "recognized" by the electronic control unit 23 from the fact that although the output signals of the wheel rotational speed sensors 86 and 87 indicate a continuing locking tendency, the position indicator output signal indicates that the modulator piston 27 has reached its end position or has at least reached its immediate vicinity, the antilocking system control valve 53 is switched back into its basic "O" position. Because the control pressure space 39 is as a result again subjected to the high outlet pressure $P_A$ of the auxiliary pressure source 57, the modulator piston 27 is again displaced so as to reduce the volume of the modulation chamber 26, which only leads to a displacement of the valve spool 46 of the function control valve 48 when the modulator piston 27 has reached the position shown in FIG. 2c. Any further displacement of the modulator piston 27 in the direction of the arrow 52 leads to the valve connection duct 77 being opened. While the modulator piston moves between the positions shown in FIGS. 2b and 2c, brake fluid will be pumped-back, if the brake pressure control valve 21 is shut off, from the decreasing sized modulation chamber 26, via the outlet non-return valve 81 into the secondary outlet pressure space 13 of the brake unit 11.

Figures 2D, 2E, 2F:
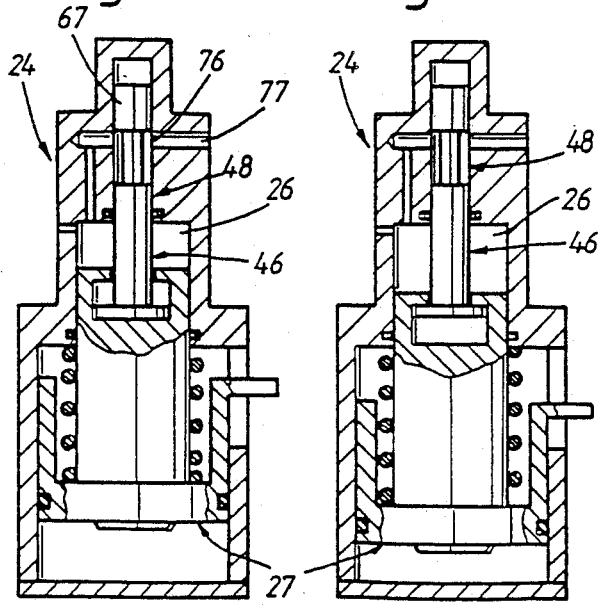

The displacement of the modulator piston 27 taking place in the direction of the arrow 52 of FIG. 1 is continued beyond the position shown in FIG. 2c at least until the valve spool 46 of the function control valve 48 has reached the position shown in FIG. 2d, in which the valve connection duct 77 has the full cross-section of its entry opening 76 freed. The brake pressure control valve 21 continues to be held in its shut off "I" position.

When the piston flange 67 of the valve spool 46 frees the entry opening 76 of the valve connecting duct 77, pressure balancing occurs between the pressure in the modulation chamber 26 of the pressure modulator 24 and the pressure in the wheel brake cylinders for the rear wheel brakes 18 and 19. This pressure balancing causes, a pressure reduction in the modulation chamber 26 so that the outlet non-return valve 81, because the pressure in the outlet pressure space 13 of the brake unit 11 is now higher than that in the modulation chamber 26, to resumes its shut off position as well. This causes limited increase in brake pressure in the wheel brakes 18 and 19 so that a locking tendency on the rear axle brake circuit II already tending to decay can again be amplified.

In order to avoid a statistically probable locking tendency caused by this operation, a brake pressure reduction stroke of the modulator piston 27 is therefore again initiated by switching the antilocking system control valve 53 back into its actuated position I to connect control space 39 to the pump at 58. A pump-back operating phase of the pressure modulator 24, on the conclusion of which the valve spool 46 of the function control valve 48 reaches the position shown in FIG. 2d, can be recognized from the characteristic output signal from the position indicator 88. This pressure reduction stroke of the modulator piston 27 is preferably continued beyond the positions of the modulator piston 27 and valve spool 46 shown in FIG. 2e (corresponding to the positions of FIG. 2a) into the positions of the modulator piston 27 and the valve pool 46 of the function control valve 48 shown in FIG. 2f (corresponding to the representation in FIG. 2b). The latter positions are equally suitable as the initial positions both for concluding the antilocking control cycle of the antilocking system 10 and for a repetition of the pump-back and brake pressure reduction phases of the antilocking control system.

In a design typical of the inventive concept of the pressure modulator 24 of the antilocking system 10, the volume of that quality of brake fluid which is accepted by the modulation chamber 26 of the pressure modulator 24 in modulation operation (and which can be forced again, into the rear wheel brakes 18 and 19 of the vehicle) is between 1/5 and ½, preferably ¼, of the volume of that quantity of brake fluid which has to be forced—by actuation of the brake unit 11 with high actuation force—into these wheel brakes 18 and 19 during a braking action, not subject to the control system. In order to generate the maximum brake pressure permitted by the design of the brake installation. The quality of brake fluid which can be displaced back per pump-back stroke of the modulator piston 27 into the outlet pressure space 13 of the brake unit 11 is approximately between ½ and ⅓ of that quantity of brake fluid which can be withdrawn from the wheel brakes 18 and 19, or can be forced back into them, by a single, maximum, modulation stroke H.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Antilocking installation for a road vehicle having a hydraulic multi-circuit brake system which includes at least one static brake circuit which is connected to an outlet pressure space of a brake unit means for providing brake pressure to the wheel brakes;

the outlet pressure space of the brake unit is connected to the wheel brakes of the static brake circuit by means of an electrically actuated brake pressure control valve means;

the brake pressure system providing for controlling brake pressure reduction, brake pressure retention and brake pressure restoration phases for antilocking control installation, and operating on the pump-back principle, at least when the antilocking control system demands high magnitude pressure reductions according to which, in a pressure reduction phase, brake fluid is drained from the wheel brakes subject to the control system and is pumped back into the output pressure space of the brake unit;

a pumping means is provided for this pumping back and includes:

a stepped cylinder with two bore sections of different diameters, offset relative to one another by means of a radial housing step;

a displaceable step piston means located in these bore sections and having piston flanges of correspondingly different diameters;

the stepped piston means being guided so that it can be displaced in a pressure-tight manner;

the larger diameter flange of the stepped piston means forming an axially movable boundary of a drive pressure space;

an electrically actuatable antilocking control valve means for connecting the drive pressure space with a high pressure outlet of a hydraulic auxiliary pressure source and for alternatively connecting the pressure space to a sump tank of the auxiliary pressure source for displacing the stepped piston means;

the small diameter flange of the stepped piston means forming a movable boundary of a functional chamber acting as the pump chamber in pump-back operation of the brake pressure setting means;

said functional chamber being connected via an outlet non-return valve means to the output pressure space associated with the static brake circuit and via an inlet valve means to the wheel brakes of the static brake circuit;

a return spring means for biasing the stepped piston means into a position associated with a maximum volume of the functional chamber which can be connected to the wheel brakes;

an electronic control means providing actuation signals for switching of a brake pressure control valve means and the electrically actuatable antilocking control valve means in response to a process of comparing and differentiating electrical output signals from wheel rotational speed sensors which are a measure of wheel peripheral speeds in signal level and/or frequency;

wherein the inlet valve means is designed as a 2/2-way valve controlled by motion of the stepped piston;

wherein the inlet valve means is held in an open position when the stepped piston is positioned to cause a minimum volume of the functional chamber which can be connected to the wheel brakes, wherein the inlet valve means, starting from this open position, can only reach its shut off position by a displacement of the stepped piston means taking place in the sense of increasing the volume of functional chamber;

wherein when the stepped means piston has reached a position in the immediate vicinity of its end position associated with a maximum volume of the functional chamber, the inlet valve means returns to an open position caused by a displacement of the stepped piston means taking place in the sense of reducing the volume of the functional chamber after the stepped piston means has executed a minimum stroke, relative to this end position;

a position indicator means for generating electrical output signals which are characteristic of the positions of the stepped piston means and which continually vary with changes in the position;

the output signal of the position indicator being applied as an additional information input to the electronic control unit means which generates signals in response to the position of the stepped piston means for switching over the antilocking control valve means to a pump-back operation of the stepped piston;

and wherein a difference in volume of the functional chamber between its maximum and minimum values is between 1/5 and $\frac{1}{3}$ of that volume of brake fluid which must be forced into the wheel brakes of the static brake circuit in order to achieve the maximum brake pressure permitted by the brake installation.

2. Antilocking system according to claim 1, wherein during a return movement of the stepped piston means a quality of brake fluid, whose volume is between $\frac{1}{4}$ and $\frac{1}{2}$ of the difference between the minimum and maximum values of the volume of the functional chamber of the stepped cylinder, can be pumped back into the outlet pressure space of the brake unit.

3. Antilocking system according to claim 2, wherein the antilocking system control valve means includes two 2/2-way valve means which can be actuated electrically;

wherein the basic position of one of these two valve means causes the output pressure of the auxiliary pressure source to be connected to the control pressure space of the stepped cylinder and an actuated position causes the control pressure space to be shut off relative to the auxiliary pressure source; and wherein the basic position of the second of these two valve means causes the control pressure space to be shut off relative to the non-pressurised sump tank of the auxiliary pressure source and an actuated position connects the control pressure space to the sump tank of the auxiliary pressure source.

4. Antilocking system according to claim 2, wherein the inlet valve means comprises a spool valve with a housing configured as an axial extension of a section of the stepped cylinder forming a boundary of the functional chamber;

a valve bore in said spool valve housing for accepting a valve body of the spool valve and being designed as a blind hole which starts at the smaller bore step from a fixed boundary of the functional chamber;

wherein the blind hole is offset by a housing step relative to this smaller bore step; and wherein the spool valve has a seal connection with said blind hole so that it can be displaced relative to the functional chamber.

5. Antilocking system according to claim 4, wherein the valve spool is provided with an end flange which forms a movable boundary of a balance space which is in continuous communicating connection, via a longitudinal and transverse duct of the spool valve housing and wherein the functional chamber of the stepped cylinder is used for accepting the brake pressure during brake modulation.

6. Antilocking system according to claim 5, wherein the end flange of the valve spool forming the boundary of the balance space also forms a part of the valve body of the inlet valve; and wherein the inlet valve in its shut off position, closes both a valve inlet duct entering the blind hole and an overflow duct leading from the blind hole to the functional chamber.

7. Antilocking system according to claim 4, wherein the valve spool of the inlet valve means is provided with a radial flange on an end section located within the functional chamber of the stepped cylinder;

said radial flange cooperating with a stop flange, pointing radially inwards on the stepped piston means; and wherein said two flanges determine a maximum magnitude h of a possible relative stroke motion between the stepped piston and the valve spool.

8. Antilocking system according to claim 7, wherein the valve spool is provided with an end flange which forms a movable boundary of a balance space which is in continuous communicating connection, via a longitudinal and transverse duct of the spool valve housing and wherein the functional chamber of the stepped cylinder is used for accepting the brake pressure during brake modulation.

9. Antilocking system according to claim 8, wherein the end flange of the valve spool forming the boundary of the balance space also forms a part of the valve body of the inlet valve; and wherein the inlet valve in its shut off position, closes both a valve inlet duct entering the blind hole and an overflow duct leading from the blind hole to the functional chamber.

10. Antilocking system according to claim 1, wherein the inlet valve means comprises a spool valve with a housing configured as an axial extension of a section of the stepped cylinder forming a boundary of the functional chamber;

a valve bore in said spool valve housing for accepting a valve body of the spool valve and being designed as a blind hole which starts at the smaller bore step from a fixed boundary of the functional chamber;

wherein the blind hole is offset by a housing step relative to this smaller bore step; and wherein the spool valve has a seal connection with said blind hole so that it can be displaced relative to the functional chamber.

11. Antilocking system according to claim 10, wherein the antilocking system control valve means includes two 2/2-way valve means which can be actuated electrically;

wherein the basic position of one of these two valve means causes the output pressure of the auxiliary pressure source to be connected to the control pressure space of the stepped cylinder and an actuated position causes the control pressure space to be shut off relative to the auxiliary pressure source; and wherein the basic position of the second of these two valve means causes the control pressure space to be shut off relative to the non-pressurised sump tank of the auxiliary pressure source and an actuated position connects the control pressure space to the sump tank of the auxiliary pressure source.

12. Antilocking system according to claim 10, wherein the valve spool is provided with an end flange which forms a movable boundary of a balance space which is in continuous communicating connection, via a longitudinal and transverse duct of the spool valve housing and wherein the functional chamber of the stepped cylinder is used for accepting the brake pressure during brake modulation.

13. Antilocking system according to claim 12, wherein the antilocking system control valve means includes two 2/2-way valve means which can be actuated electrically;

wherein the basic position of one of these two valve means causes the output pressure of the auxiliary pressure source to be connected to the control pressure space of the stepped cylinder and an actuated position causes the control pressure space to be shut off relative to the auxiliary pressure source; and wherein the basic position of the second of these two valve means causes the control pressure space to be shut off relative to the non-pressurised sump tank of the auxiliary pressure source and an actuated position connects the control pressure space to the sump tank of the auxiliary pressure source.

14. Antilocking system according to claim 12, wherein the end flange of the valve spool forming the boundary of the balance space also forms a part of the valve body of the inlet valve; and wherein the inlet valve in its shut off position, closes both a valve inlet duct entering the blind hole and an overflow duct leading from the blind hole to the functional chamber.

15. Antilocking system according to claim 14, wherein the antilocking system control valve means includes two 2/2-way valve means which can be actuated electrically;

wherein the basic position of one of these two valve means causes the output pressure of the auxiliary pressure source to be connected to the control pressure space of the stepped cylinder and an actuated position causes the control pressure space to be shut off relative to the auxiliary pressure source; and wherein the basic position of the second of these two valve means causes the control pressure space to be shut off relative to the non-pressurised sump tank of the auxiliary pressure source and an actuated position connects the control pressure space to the sump tank of the auxiliary pressure source.

16. Antilocking system according to claim 10, wherein the valve spool of the inlet valve means is provided with a radial flange on an end section located within the functional chamber of the stepped cylinder;

said radial flange cooperating with a stop flange, pointing radially inwards on the stepped piston means; and wherein said two flanges determine a maximum magnitude h of a possible relative stroke motion between the stepped piston and the valve spool.

17. Antilocking system according to claim 16, wherein the antilocking system control valve means includes two 2/2-way valve means which can be actuated electrically;

wherein the basic position of one of these two valve means causes the output pressure of the auxiliary pressure source to be connected to the control pressure space of the stepped cylinder and an actuated position causes the control pressure space to be shut off relative to the auxiliary pressure source; and wherein the basic position of the second of these two valve means causes the control pressure space to be shut off relative to the non-pressurised sump tank of the auxiliary pressure source and an actuated position connects the control pressure space to the sump tank of the auxiliary pressure source.

18. Antilocking system according to claim 16, wherein the valve spool is provided with an end flange which forms a movable boundary of a balance space which is in continuous communicating connection, via a longitudinal and transverse duct of the spool valve housing and wherein the functional chamber of the stepped cylinder is used for accepting the brake pressure during brake modulation.

19. Antilocking system according to claim 18, wherein the end flange of the valve spool forming the boundary of the balance space also forms a part of the valve body of the inlet valve; and wherein the inlet valve in its shut off position, closes both a valve inlet duct entering the blind hole and an overflow duct leading from the blind hole to the functional chamber.

20. Antilocking system according to claim 1, wherein the antilocking system control valve means includes two 2/2-way valve means which can be actuated electrically;

wherein the basic position of one of these two valve means causes the output pressure of the auxiliary pressure source to be connected to the control pressure space of the stepped cylinder and an actuated position causes the control pressure space to be shut off relative to the auxiliary pressure source; and wherein the basic position of the second of these two valve means causes the control pressure space to be shut off relative to the non-pressurised sump tank of the auxiliary pressure source and an actuated position connects the control pressure space to the sump tank of the auxiliary pressure source.

* * * * *